April 26, 1927. H. F. LOWENSTEIN ET AL Re. 16,606
RADIO RECEIVING APPARATUS
Original Filed Aug. 14, 1922
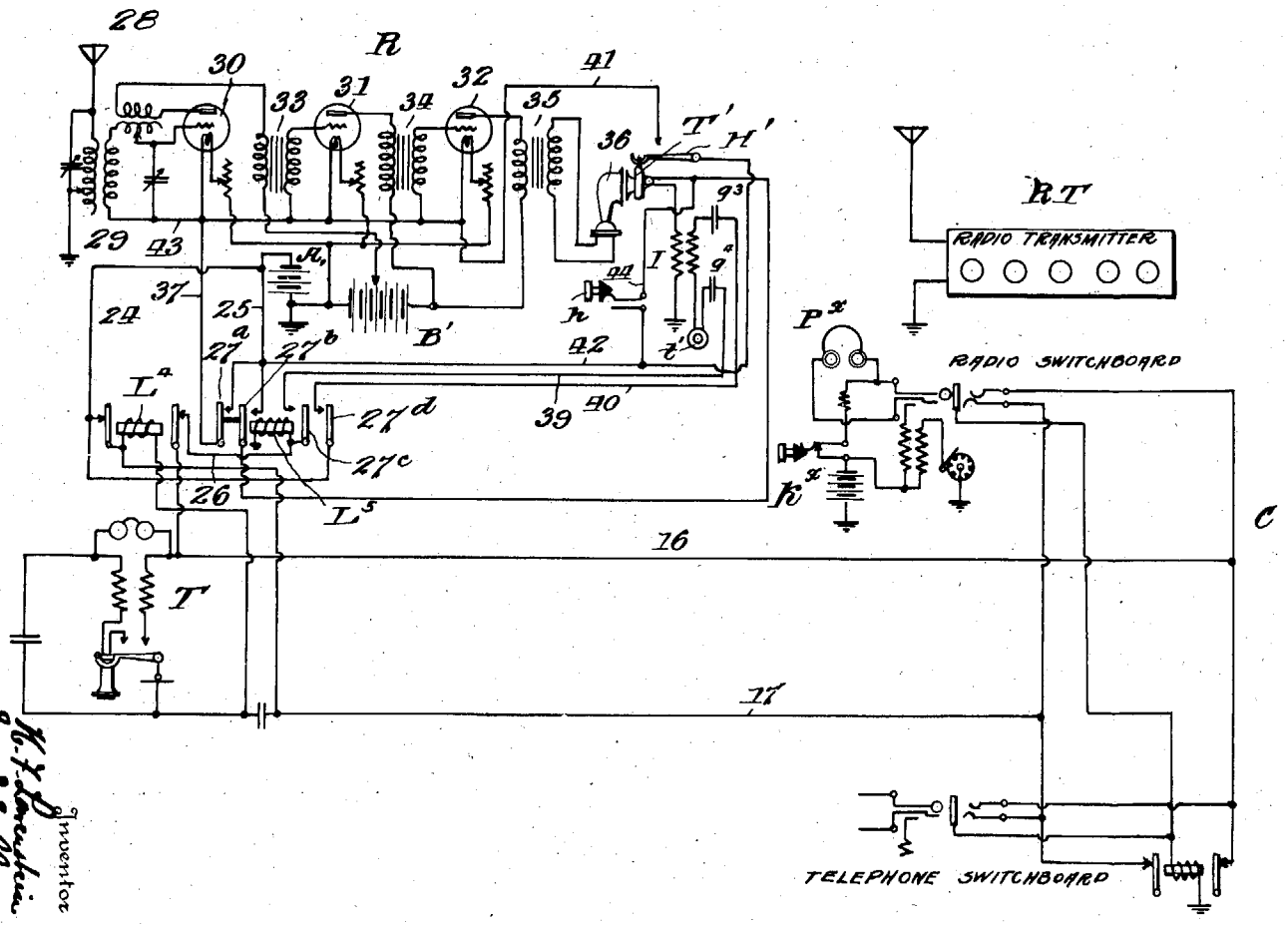
Inventor
H. F. Lowenstein
Edward E. Clement
By Edward E. Clement
Attorney Reissued Apr. 26, 1927. Re. 16,606

UNITED STATES PATENT OFFICE.

HARRY F. LOWENSTEIN AND EDWARD E. CLEMENT, OF WASHINGTON, DISTRICT OF COLUMBIA, ASSIGNORS, BY DIRECT AND MESNE ASSIGNMENTS, TO EDWARD F. COLLADAY, OF WASHINGTON, DISTRICT OF COLUMBIA.

RADIO RECEIVING APPARATUS.

Original application filed August 14, 1922, Serial No. 581,773. Renewed July 22, 1924. Original No. 1,522,308, dated January 6, 1925. Application for reissue filed January 6, 1927. Serial No. 159,461.

Our invention relates to combined radiophone and telephone systems, and has for its object the provision of improved means by which an operator at a radio switchboard may supervise the operation of a radio receiving apparatus at a subscriber's station.

It has been proposed in such systems to provide a test or listening relay at the subscriber's station, connected to the telephone wire circuit and controlled by a radio operator at central to connect the substation radio receiving apparatus or circuits to the wire circuit for telephonic transmission thereover to central, whereby the said radio operator may listen to the actual sounds received and reproduced at the substation while broadcasting, with a view to the regulation and adjustment of the transmitting instrument or the receiving instrument, or both. In the present case, we provide for such supervision by connecting a telephone transmitter to the contacts of the listening relay, and so relating said transmitter to the receiver or loud speaker of the radio receiving set that air conduction of sound waves takes place between them, and a test of the complete performance of the apparatus as a whole is possible.

Our invention is illustrated in the accompanying drawing, in which the figure is a diagram showing a central office having a telephone switchboard and a radio switchboard, a subscriber's station equipped with a telephone and a radio receiving set, and the line circuit therefrom to central.

Referring to the drawing, C is the central office which for convenience is shown equipped with manual apparatus, but which may have automatic switching apparatus, for the interconnection of telephone lines, or for the radio station control, or both. The line 16—17 is connected as usual to terminals on the telephone switchboard and to one or more multiple terminals on the radio switchboard, where the radio operator has cord circuits typified at $P\varpi$, equipped with a switch $K\varpi$ for connecting battery to the tip side of line, the cut off relay of the line being at the same time energized to clear said side of ground at the central office, which is normally connected through the windings of the line relay.

At the substation A, the telephone T is a standard common battery instrument set. The radio receiving apparatus is equipped with another telephone set, comprising a transmitter T′, receiver $t'$, induction coil I, hook switch H′ and condensers $q^3$, $q^4$. The radio set in itself forms no part of the present invention, but to supply a loud speaking horn for our purposes, is shown as having a detector tube 30, and two stages of audio amplification by tubes 31 and 32. The usual transformers 33, 34, 35 are provided, with batteries $A_1$ and $B_1$ for filaments and plates. The horn 36 and the switch hook H′ are so related that when the telephone T′ is hung on the hook it will be in position to receive sound waves from the horn. When the hook H′ is up it closes the filament circuits as follows: $A_1$, 25, 42, H′, 41, filaments, battery. When the hook is down, the radio operator at central can close the filament circuit and also the circuit of transmitter T by pulling up relay $L^5$. For this purpose, key $K\varpi$ is closed, and battery current flows over tip side 16 of line to the substation, thence through back contact of cut off relay $L^4$ by wire 26 to $L^5$ and ground. $L^5$ becoming energized, closes the following circuits: filament circuit from A, 25, $27^a$, 37, 43; transmitter circuit from $A_1$ to 25, $27^b$, T′, I, and back to battery, shown as by ground return, but may be by wire; line transmission circuit: 16, contact of $L^4$, 26, $27^c$, 39, $q^4$, $t'$, I, $q^3$, 40, $27^d$, back contact of $L^4$, and so to sleeve side 17 of line. The operator thus controls both the filament circuit and the repeat back circuit, and as the telephonic connection between the line and the radio set includes the horn 36, a complete test is available of the entire apparatus and the actual tones produced thereby.

While we have described and shall claim herein combined radiophone and telephone systems specifically we do not limit ourselves thereby to any particular medium for broadcast transmission, the main feature of the invention being the centralized supervision of high frequency broadcast reception over any suitable transmitting medium, by means of the actual air waves or sound waves issuing from the receiver at a receiving station.

We claim:

1. In a combined radio and telephone system, a central station, a subscriber's station, a wire circuit connecting them, a radio receiving set at the subscriber's station, and a telephone transmitter related thereto so as to receive sound waves therefrom, with means controllable by a radio operator at the central station to close the circuits of said transmitter for current supply thereto and for telephonic transmission over the wire circuit to central.

2. In a combined high frequency broadcast and telephone system, a central station, a subscriber's station, a wire circuit connecting them, a high frequency wave-receiving-and-detecting set at the subscriber's station and a telephone transmitter related thereto so as to receive sound waves therefrom, with means at the central station to close the circuits of said transmitter for current supply thereto and for telephone transmission over the wire circuit to central.

3. In a high frequency broadcast system, a plurality of receiving stations having receiving apparatus tuned to a fixed standard wave length, a common transmitting station, equipped with transmitting apparatus tuned to said standard wave length, supervisory apparatus for determining when the receiving apparatus at a receiving station is operating in resonance with the broadcast transmitter, comprising a wire circuit extending from said supervisory apparatus to said receiving station, and a telephone transmitter connected to said wire circuit at the receiving station and related to the broadcast receiving apparatus thereat so as to receive sound waves therefrom and transmit corresponding current waves over the wire circuit to the supervisory apparatus.

4. In a high frequency broadcast system, a plurality of receiving stations, a high frequency wave-receiving-and-detecting set at each station and a telephone transmitter related thereto so as to receive sound waves therefrom, and a central supervisory station having a wired circuit connection to said telephone transmitter.

5. In a high frequency broadcast system, a plurality of receiving stations, a high frequency wave-receiving-and-detecting set at each station and a telephone transmitter related thereto so as to receive sound waves therefrom, and a central supervisory station having a wired circuit connection to said telephone transmitter, together with means at said supervisory station to close the circuit of said transmitter for telephonic transmission over said wire circuit to the supervisory station.

6. The method of supervising and regulating high frequency broadcast distribution which consists in transmitting over a suitable medium and receiving therefrom at a plurality of tuned receiving stations, causing the apparatus at each station to reproduce the original audio modulations in the form of audible air waves or sound waves, causing said sound waves to be transmitted telephonically to and received at a common point.

In testimony whereof we hereunto affix our signatures.

HARRY F. LOWENSTEIN.
EDWARD E. CLEMENT.